United States Patent
Yamamoto et al.

(10) Patent No.: US 9,823,359 B2
(45) Date of Patent: Nov. 21, 2017

(54) RADIATION IMAGE DETECTION DEVICE

(71) Applicant: HAMAMATSU PHOTONICS K.K., Hamamatsu-shi, Shizuoka (JP)

(72) Inventors: Koei Yamamoto, Hamamatsu (JP); Toshihiro Oikawa, Hamamatsu (JP); Hiroki Suzuki, Hamamatsu (JP); Yuichi Miyamoto, Hamamatsu (JP); Naoto Sakurai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/782,923

(22) PCT Filed: Jan. 24, 2014

(86) PCT No.: PCT/JP2014/051534
§ 371 (c)(1),
(2) Date: Oct. 7, 2015

(87) PCT Pub. No.: WO2014/167873
PCT Pub. Date: Oct. 16, 2014

(65) Prior Publication Data
US 2016/0061964 A1 Mar. 3, 2016

(30) Foreign Application Priority Data
Apr. 9, 2013 (JP) .................... 2013-081188

(51) Int. Cl.
*G01T 1/00* (2006.01)
*G01T 1/20* (2006.01)
(Continued)

(52) U.S. Cl.
CPC .......... *G01T 1/2014* (2013.01); *G01T 1/2018* (2013.01); *G02B 5/04* (2013.01);
(Continued)

(58) Field of Classification Search
CPC ....... G01T 1/2014; G01T 1/2018; G02B 5/04; G02B 26/0833
(Continued)

(56) References Cited

U.S. PATENT DOCUMENTS 4,591,715 A 5/1986 Goto
5,538,850 A 7/1996 King et al.
(Continued)

FOREIGN PATENT DOCUMENTS

CN 1440039 9/2003
CN 1587979 3/2005
(Continued)

OTHER PUBLICATIONS

International Preliminary Report on Patentability dated Oct. 22, 2015 for PCT/JP2014/051534.

*Primary Examiner* — Kevin Pyo
(74) *Attorney, Agent, or Firm* — Drinker Biddle & Reath LLP

(57) ABSTRACT

A radiation image detecting device includes a photodetecting element that detects fluorescence light, and a prism that is disposed on an optical path of excitation light traveling toward an imaging plate and between the photodetecting element and the imaging plate. The prism includes, as surface thereof, a side face that is opposed to the imaging plate, and a side face and a side face that are inclined relative to the side face. The prism is disposed so that the excitation light incident through the side face propagates inside and is output from the side face and so that reflection from the imaging plate incident through the side face propagates inside and is output from the side face. The photodetecting element is disposed so as to be opposed to a region different from a region where the reflection from the imaging plate is output, in the surface of the prism.

7 Claims, 9 Drawing Sheets

(51) Int. Cl.
  *G21K 4/00* (2006.01)
  *G03B 42/02* (2006.01)
  *G02B 5/04* (2006.01)
  *G02B 26/08* (2006.01)
  *G03B 42/08* (2006.01)

(52) U.S. Cl.
  CPC ....... *G02B 26/0833* (2013.01); *G03B 42/023* (2013.01); *G03B 42/08* (2013.01); *G21K 4/00* (2013.01)

(58) Field of Classification Search
  USPC .................. 250/582, 585, 586, 458.1, 208.1
  See application file for complete search history.

(56) References Cited

U.S. PATENT DOCUMENTS

| | | | | |
|---|---|---|---|---|
| 6,023,071 | A * | 2/2000 | Ogura | .................. G01T 1/2942 250/458.1 |
| 6,594,011 | B1 | 7/2003 | Kempen | |
| 7,518,724 | B2 * | 4/2009 | Rassman | ................ G01N 21/21 356/369 |
| 2003/0136921 | A1 | 7/2003 | Reel | |
| 2008/0143889 | A1 | 6/2008 | Mukaida et al. | |
| 2014/0118554 | A1 | 5/2014 | Bucknor | |

FOREIGN PATENT DOCUMENTS

| | | |
|---|---|---|
| CN | 1712939 | 12/2005 |
| CN | 1782698 | 6/2006 |
| EP | 1 221 631 A1 | 7/2002 |
| EP | 1 932 632 | 6/2008 |
| JP | S55-48674 A | 4/1980 |
| JP | S60-194403 | 10/1985 |
| JP | S60-194404 | 10/1985 |
| JP | S61-65231 A | 4/1986 |
| JP | S61-189763 A | 8/1986 |
| JP | S64-012759 | 1/1989 |
| JP | H06-130526 A | 5/1994 |
| JP | H7-218554 | 9/1995 |
| JP | 2001-337406 | 12/2001 |
| TW | 200630463 | 9/2006 |
| TW | 200914078 | 4/2009 |
| TW | 201239898 | 10/2012 |
| WO | WO 92/11545 | 7/1992 |
| WO | WO 2008/048694 | 4/2008 |

* cited by examiner

*Fig.3*
(a)
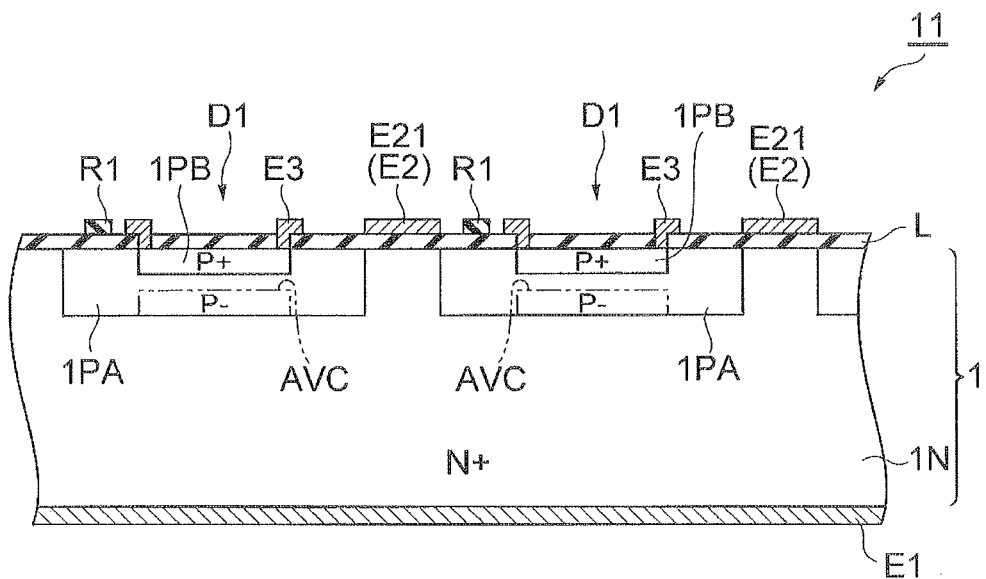
(b)
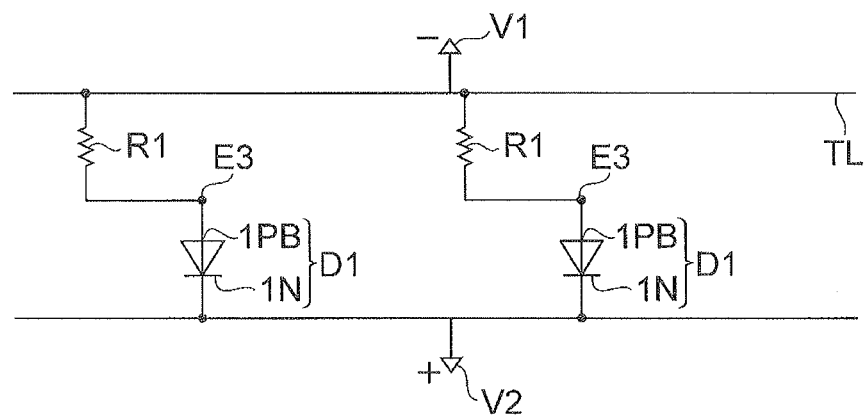

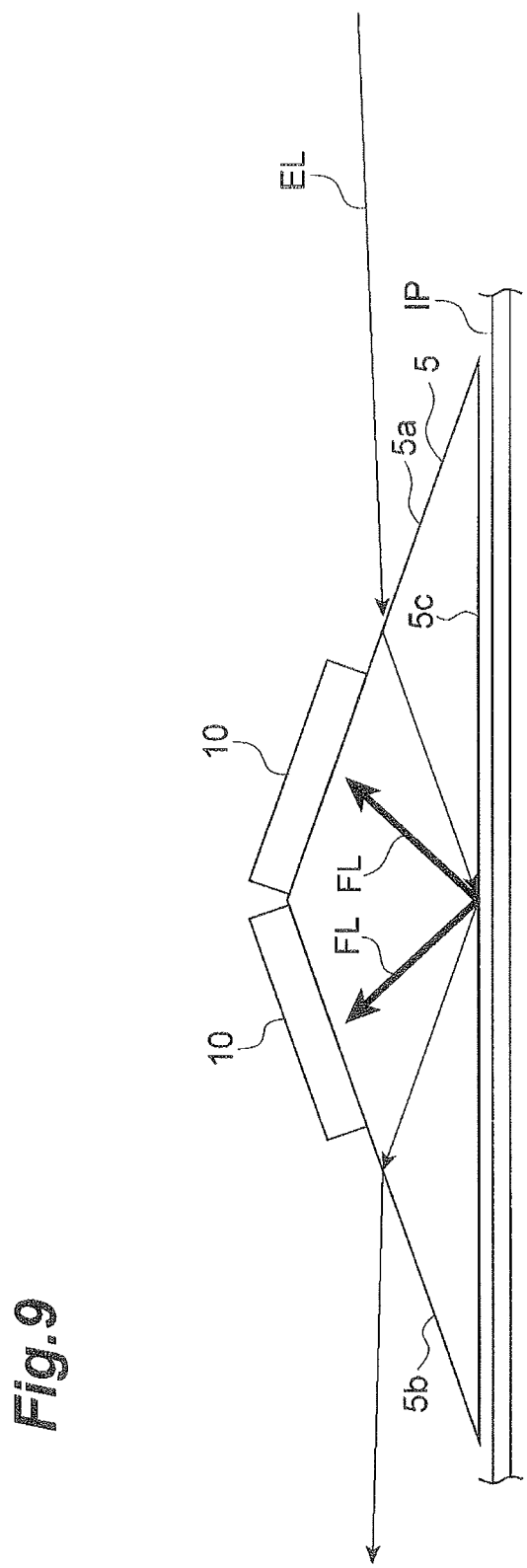

RADIATION IMAGE DETECTION DEVICE

TECHNICAL FIELD

The present invention relates to a radiation image detecting device.

BACKGROUND ART

A photo-stimulable phosphor is excited by laser light applied to the photo-stimulable phosphor, to emit light. Reading devices are known that apply the laser light (excitation light) to the photo-stimulable phosphor and convert the light emitted from the photo-stimulable phosphor, into an electric signal by a photodetecting element (e.g., cf. Patent Literature 1).

CITATION LIST

Patent Literature

Patent Literature 1: Japanese Patent Application Laid-open Publication No. H06-130526

SUMMARY OF INVENTION

Technical Problem

It is an object of the present invention to provide a radiation image detecting device capable of preventing the photodetecting element from detecting the excitation light.

Solution to Problem

A radiation image detecting device according to one aspect of the present invention is a radiation image detecting device that detects fluorescence light emitted from a recording medium with a radiation image recorded therein by applying excitation light to the recording medium with the radiation image recorded therein. The radiation image detecting device includes a photodetecting element that detects the fluorescence light and a prism that is disposed so as to be located on an optical path of the excitation light traveling toward the recording medium and between the photodetecting element and the recording medium. The prism has, as surface thereof, a first face that is opposed to the recording medium and a second face and a third face that are inclined relative to the first face, and is disposed so that the excitation light incident through the second face propagates inside and is output from the first face and so that reflection from the recording medium incident through the first face propagates inside and is output from the second face or from the third face. The photodetecting element is disposed so as to be opposed to a region different from a region where the reflection from the recording medium is output, in the surface of the prism.

In the radiation image detecting device according to the one aspect of the present invention, the excitation light is incident through the second face not facing the recording medium, into the prism and is output from the first face. The fluorescence light is incident through the first face into the prism and propagates inside the prism to enter the photodetecting element. The reflection incident through the first face into the prism is output from the second face or the third face not facing the recording medium. The photodetecting element is disposed so as to be opposed to the region different from the region where the reflection is output, in the surface of the prism. Therefore, it is hard for the excitation light to enter the photodetecting element. This radiation image detecting device can prevent the photodetecting element from detecting the excitation light.

The third face may be a face that transmits the excitation light, and the prism may be disposed so as to output the reflection from the recording medium incident through the first face, from the third face. In this case, the excitation light incident through the second face is output from the first face to be applied to the recording medium. The reflection incident through the first face into the prism is output from the third face. Since the photodetecting element is disposed so as to be opposed to the region different from the region where the reflection is output, in the surface of the prism, it is hard for the excitation light to enter the photodetecting element. Therefore, the photodetecting element can be surely prevented from detecting the excitation light.

The third face may be a face that reflects the excitation light, and the prism may be disposed so that the excitation light incident through the second face is reflected by the third face and output from the first face and so that the reflection from the recording medium incident through the first face is output from the second face. In this case, the excitation light incident through the second face is output from the first face after reflected by the third face, and then is applied to the recording medium. The reflection incident through the first face into the prism is output from the second face. Since the photodetecting element is disposed so as to be opposed to the region different from the region where the reflection is output, in the surface of the prism, it is hard for the excitation light to enter the photodetecting element. Therefore, the photodetecting element can be surely prevented from detecting the excitation light.

The photodetecting element may be disposed so as to be opposed to a region different from a region where the excitation light is incident, in the second face. In this case, since the photodetecting element is disposed so as to be opposed to the region different from the region where the excitation light is incident, in the second face, it is hard for the excitation light to enter the photodetecting element. Therefore, the photodetecting element can be surely prevented from detecting the excitation light.

The photodetecting element may be disposed so as to be opposed to a region different from a region where the reflection from the recording medium is output, in the third face. In this case, since the photodetecting element is disposed so as to be opposed to the region different from the region where the reflection is output, in the third face, it is hard for the excitation light to enter the photodetecting element. Therefore, the photodetecting element can be surely prevented from detecting the excitation light.

The prism may have a fourth face that is opposed to the first face as the surface, and the photodetecting element may be disposed so as to be opposed to the fourth face. In this case, since the photodetecting element is disposed so as to be opposed to the fourth face, which is different from the second face or the third face from which the excitation light is output, it is hard for the excitation light to enter the photodetecting element. Therefore, the photodetecting element can be surely prevented from detecting the excitation light.

The photodetecting element includes a plurality of channels, each channel including a photodiode array that includes a plurality of avalanche photodiodes to operate in Geiger mode, and quenching resistors connected in series to the respective avalanche photodiodes. In this case, it is hard for the excitation light to enter the plurality of avalanche photodiodes. If the excitation light is incident to the plurality of avalanche photodiodes, not only the fluorescence light but also the excitation light will be subjected to avalanche multiplication. Since it is hard for the excitation light to enter the plurality of avalanche photodiodes, this configuration can minimize influence of the excitation light that could increase due to the avalanche multiplication.

Advantageous Effect of Invention

The present invention can provide the radiation image detecting device capable of preventing the photodetecting element from detecting the excitation light.

BRIEF DESCRIPTION OF DRAWINGS

FIG. 3 is (a) a cross-sectional view taken along II-II and viewed in a direction of arrows, of the photodiode array shown in FIG. 2, and (b) a circuit diagram thereof.

FIG. 9 is a cross-sectional view of a prism.

DESCRIPTION OF EMBODIMENTS

An embodiment of the present invention will be described below in detail with reference to the accompanying drawings. Identical elements or elements with identical functionality will be denoted by the same reference signs in the description, without redundant description.

Figure 1:
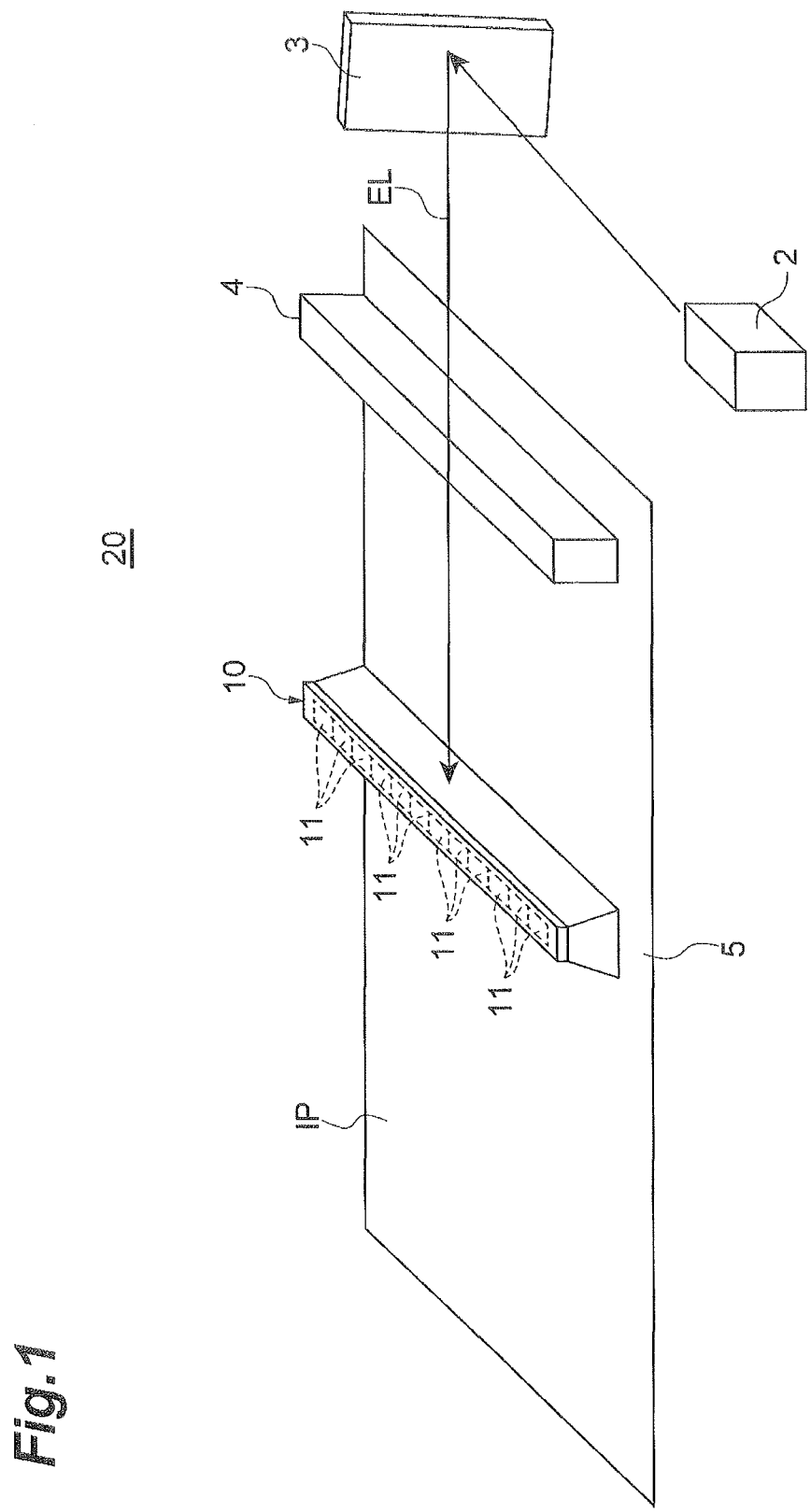
FIG. 1 is a schematic configuration diagram showing a radiation image detecting device according to an embodiment.

First, a configuration of a radiation image detecting device 20 according to the present embodiment will be described with reference to FIG. 1. FIG. 1 is a schematic configuration diagram showing the radiation image detecting device according to the embodiment.

The radiation image detecting device 20 applies excitation light EL to an imaging plate IP and detects fluorescence light emitted thereby from the imaging plate IP. The imaging plate IP is a recording medium with a radiation image recorded therein. The wavelength of the fluorescence light emitted from the imaging plate IP is different from the wavelength of the excitation light.

The radiation image detecting device 20 has an excitation light source 2, a MEMS (Micro Electro Mechanical System) mirror 3, a scan lens 4, a prism 5, and a photodetecting element 10. The photodetecting element 10 is disposed so as to be opposed to the prism 5.

The excitation light EL emitted from the excitation light source 2 is reflected by the MEMS mirror 3 and then passes through the scan lens 4. The excitation light EL having passed through the scan lens 4 is then incident into the prism 5. The prism 5 is disposed on the optical path of the excitation light EL. The excitation light EL incident into the prism 5 is refracted in the prism 5 to be applied to the imaging plate IP.

When the excitation light EL is applied to the imaging plate IP, the fluorescence light is emitted from the imaging plate IP. The photodetecting element 10 detects the fluorescence light emitted from the imaging plate IP. The photodetecting element 10 includes a plurality of channels, each of which includes a photodiode array 11. A configuration of the photodiode array 11 according to the present embodiment will be described below with reference to FIGS. 2 to 4.

Figure 2:
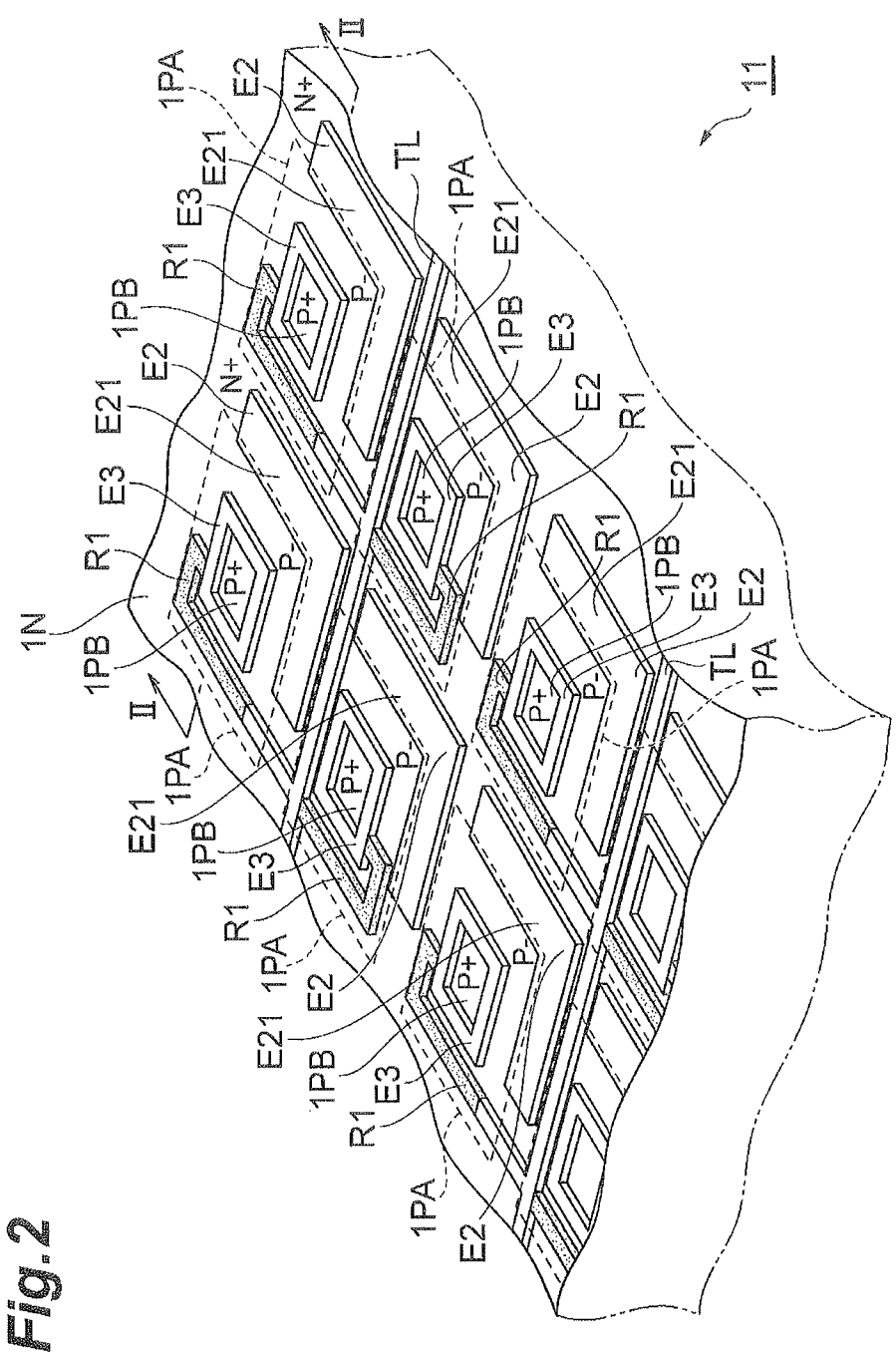
FIG. 2 is a perspective view of a photodiode array according to the embodiment.
Figure 4:
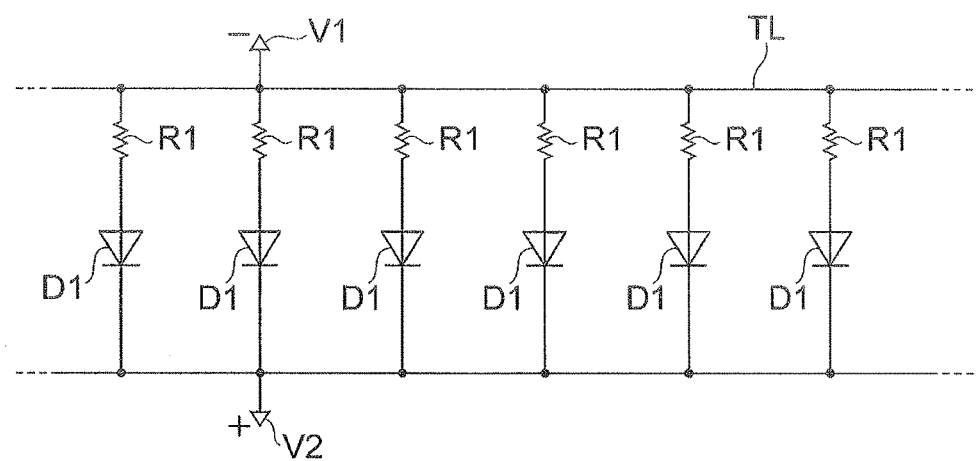
FIG. 4 is a circuit diagram of the photodiode array according to the embodiment.

FIG. 2 is a perspective view of the photodiode array 11. FIG. 3 is (a) a cross-sectional view taken along II-II and viewed in a direction of arrows, of the photodiode array shown in FIG. 2 and (b) a circuit diagram thereof. FIG. 4 is a circuit diagram of the whole of the photodiode array.

In the photodiode array 11, a plurality of photodiodes D1 (cf. FIG. 4) are formed on an N-type (first conductivity type) semiconductor substrate 1N.

Each individual photodiode D1 includes a P-type (second conductivity type) first semiconductor region 1PA formed on one surface side of the semiconductor substrate 1N, and a P-type (second conductivity type) second semiconductor region 1PB formed in the first semiconductor region 1PA. The second semiconductor region 1PB has a higher impurity concentration than the first semiconductor region 1PA. The photodiode D1 includes a first electrode E1 electrically connected to the semiconductor substrate 1N and a surface electrode E3 formed on the second semiconductor region 1PB. The planar shape of the first semiconductor region 1PA is quadrangular. The second semiconductor region 1PB is located inside the first semiconductor region and the planar shape thereof is quadrangular. The depth of the first semiconductor region 1PA is larger than that of the second semiconductor region 1PB. The semiconductor substrate 1 in FIG. 3 shows one including the N-type semiconductor substrate 1N and both of the P-type semiconductor regions 1PA, 1PB.

The photodiode array 11 includes a first reflector E2 consisting of a metal layer, and a resistive layer (quenching resistor) R1, for each of the individual photodiodes D1. The first reflector E2 is formed through an insulating layer L (cf. FIG. 3) on the semiconductor substrate 1N outside the first semiconductor region 1PA. The resistive layer R1 includes one end continuous to the surface electrode E3 and extends along the surface of the insulating layer L on the first semiconductor region 1PA. In FIG. 2, illustration of the insulating layer L shown in FIG. 3 is omitted for clarification of structure.

The first reflector E2 is comprised of a reflector E21 consisting of a metal layer with the planar shape of an L-shape. The first reflector E21 (E2) located on the semiconductor region 1N is electrically isolated from the surface electrode E3 of a ring shape having a first opening. Namely, an anode and a cathode of the photodiode D1 are provided with respective electrodes and one surface electrode E3 is electrically separated from the first reflector E2. This makes the first reflector E2 definitely distinguished from the surface electrode E3 and increases degrees of freedom of design for arranging it at a location suitable for reflection. The other end of the resistive layer R1 connected to each individual photodiode D1 is electrically connected, through a wiring electrode continuous to the resistive layer R1 if necessary, to a common signal readout line TL.

In FIG. 2, a pair of photodiodes (regions immediately below the semiconductor regions 1PA) adjacent in a column direction both are connected though their respective resistive layers R1 to the signal readout line TL extending in a row direction. A plurality of pairs of photodiodes are connected through their respective resistive layers R1 to one signal readout line TL. A plurality of signal readout lines TL extending in the row direction are disposed along the column direction. A plurality of pairs of photodiodes are also connected similarly through their respective resistive layers R1 to each of the individual signal readout lines TL. All the signal readout lines TL shown in FIG. 4 are connected eventually to constitute the circuit as shown in FIG. 4, as one signal readout line TL in terms of circuitry.

The resistive layer R1 has the higher resistivity than the surface electrode E3 to which the resistive layer R1 is connected, and has the higher resistivity than the first reflector E2. Specifically, the resistive layer R1 is comprised of polysilicon and the rest electrodes and reflector all are comprised of metal such as aluminum. When the semiconductor substrate 1 is comprised of Si, an electrode material often used is AuGe/Ni or the like, besides aluminum. A P-type impurity to be used in the case using Si is a Group 3 element such as B and an N-type impurity to be used in that case is a Group 5 element such as N, P, or As. A device may be configured by replacing the N-type and P-type of conductivity types of semiconductors with each other, while the device can also function well. Examples of methods to be used for adding these impurities include the diffusion method and ion implantation method.

A material of the insulating layer L to be used can be $SiO_2$ or SiN. A method to be used for forming the insulating layer L, when the insulating layer L is comprised, for example, of $SiO_2$, can be the thermal oxidation method or the sputtering method.

In the case of the above-described structure, a PN junction is constituted between the N-type semiconductor substrate 1N and the P-type first semiconductor region 1PA, thereby forming the photodiode D1. The semiconductor substrate 1N is electrically connected to the first electrode E1 which is formed on the back surface of the substrate. The first semiconductor region WA is connected through the second semiconductor region 1PB to the surface electrode E3. The resistive layer R1 is connected in series to the photodiode D1 (cf. FIG. 3 (b)).

In the photodiode array 11, each individual photodiode D1 is made to operate in Geiger mode. In Geiger mode, a reverse voltage (reverse bias voltage) larger than the breakdown voltage of the photodiode D1 is applied between the anode and cathode of the photodiode D1. Namely, a (−) electric potential V1 is applied to the anode and a (+) electric potential V2 to the cathode. The polarities of these electric potentials are relative ones, and it is also possible to set one of the electric potentials to the ground potential.

The anode is the P-type semiconductor region 1PA and the cathode the N-type semiconductor region 1N. The photodiode D1 functions as an avalanche photodiode. When light (photons) is incident to the photodiode D1, photoelectric conversion takes place inside the substrate to generate photoelectrons. In a neighboring region AVC near the PN junction interface in the P-type semiconductor region 1PA shown in FIG. 3 (a), avalanche multiplication is induced, and a group of multiplied electrons flow toward the electrode E1.

The first reflector E2 is disposed on the surface of the semiconductor substrate 1N outside the first semiconductor region 1PA with the relatively low impurity concentration, compared to the second semiconductor region 1PB. The region of exposed surface of the semiconductor substrate 1N is a dead space having little contribution to detection, for incidence of light. The first reflector E2 reflects incident, light and makes the reflected light incident to a second reflector (e.g., an inner surface of a metal package or the like). The second reflector again reflects the incident light to effectively guide the re-reflected light to the photodiodes D1.

The other ends of the resistive layers R1 connected to the individual photodiodes D1 are electrically connected to the common signal readout line TL along the surface of the semiconductor substrate 1N. The plurality of photodiodes D1 operate in Geiger mode and each photodiode D1 is connected to the common signal readout line TL. For this reason, when photons are simultaneously incident to the plurality of photodiodes D1, outputs from the plurality of photodiodes D1 are fed all to the common signal readout line TL and are measured as a high-intensity signal according to the number of incident photons as a whole. A load resistor to cause a voltage drop for readout of signal may be connected to the signal readout line TL.

The above-described structure is the configuration of the front-illuminated photodiode array, and it is also possible to adopt the configuration of the back-illuminated photodiode array. In this case, the thickness of the semiconductor substrate 1N is made smaller and the back-side electrode E1 is made as a transparent electrode. The back-side electrode E1 may be disposed at another position (e.g., on the front surface side of the substrate) on the semiconductor substrate 1N.

Figure 5:
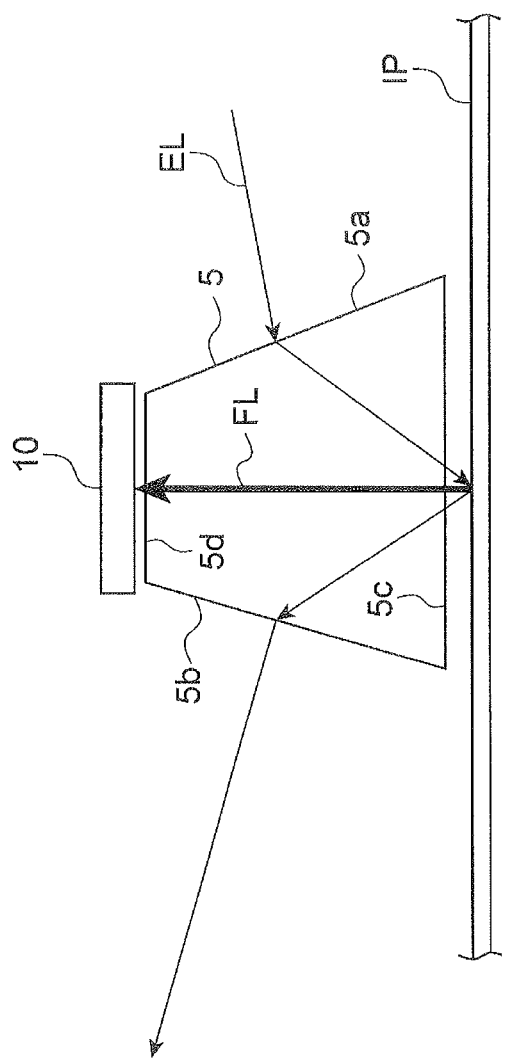
FIG. 5 is a cross-sectional view of a prism.

Next, a configuration of the prism 5 will be described with reference to FIG. 5. FIG. 5 is a cross-sectional view of the prism. As shown in FIG. 5, the prism 5 has a cross section of a trapezoid shape. The prism 5 includes, as surface thereof, a pair of side faces 5c, 5d opposed and parallel to each other, and a pair of side faces 5a, 5b opposed to each other and extending so as to connect the pair of side faces 5c, 5d. Each of the side faces 5a, 5b, 5c, and 5d constitutes a corresponding side of a trapezoid which is the cross-sectional shape of the prism 5. The side face 5c constitutes the side of the larger length, out of the pair of sides parallel to each other in the trapezoid. The side face 5d constitutes the side of the smaller length, out of the pair of sides parallel to each other in the trapezoid. The imaging plate IP is disposed so as to be opposed to the prism 5. Namely, the prism 5 is opposed to the imaging plate IP. In more detail, the side face 5e (first face) of the prism 5 is opposed to the imaging plate IP. The side face 5d (fourth face) of the prism 5 is opposed to the photodetecting element 10. The side face 5d is coated with a coating (excitation light cut coating) for preventing the excitation light EL from being output from the prism 5.

The excitation light EL is incident through the side face 5a (second face) into the prism 5. Namely, the side face 5a is an incidence surface for the excitation light EL. The side face 5a is not opposed to the imaging plate IP. The side face 5a is coated with an antireflection coating for preventing reflection of the excitation light EL. The side face 5a is inclined relative to the side face 5c. The side face 5b (third face) opposed to the side face 5a is a face that transmits the excitation light EL. The side face 5b is also inclined relative to the side face 5c. The photodetecting element 10 is disposed so as to be opposed to the side face 5d of the prism 5. The photodetecting element 10 detects the fluorescence light FL.

In the radiation image detecting device 20, when the excitation light EL is incident through the side face 5a into the prism 5, the excitation light EL propagates inside the prism 5 and is output from the side face 5c. Namely, the prism 5 is configured so as to output the excitation light EL incident through the side face 5a, from the side face 5c. The excitation light EL output from the side face 5c (prism 5) is applied to the imaging plate IP. When the imaging plate IP is irradiated with the excitation light EL, the imaging plate IP emits the fluorescence light FL. The photodetecting element 10 is disposed so as to be opposed to the side face 5d of the prism 5. The fluorescence light FL is incident through the side face 5c into the prism 5. The fluorescence light FL incident into the prism 5 propagates inside the prism 5 and is output from the side face 5d. Namely, the prism 5 is also configured so as to output the fluorescence light FL incident through the side face 5c, from the side face 5d. The fluorescence light FL output from the side face 5d (prism 5) is incident to the photodetecting element 10 to be detected by the photodetecting element 10. The excitation light EL as reflection from the imaging plate IP is incident through the side face 5c into the prism 5. The reflection (excitation light EL) incident into the prism 5 propagates inside the prism 5 and is output from the side face 5b. Namely, the prism 5 is also configured so as to output the reflection (excitation light EL) incident through the side face 5c, from the side face 5b.

In the radiation image detecting device 20, as described above, the prism 5 is located between the imaging plate IP and the photodetecting element 10. The prism 5 is disposed so that the excitation light EL incident through the side face 5a is output from the side face 5c and so that the reflection incident through the side face 5c is output from the side face 5b. The imaging plate IP is irradiated with the excitation light EL output from the side face 5c. The fluorescence light FL emitted from the imaging plate IP is incident through the side face 5c into the prism 5. The prism 5 is disposed so that the fluorescence light FL incident through the side face 5c is output from the side face 5d. The prism 5 outputs the excitation light EL and the fluorescence light FL from the different side faces 5b, 5c, 5d. The prism 5 makes the excitation light EL travel not toward the side face 5d to which the photodetecting element 10 is opposed, but toward the side face 5b to which the photodetecting element 10 is not opposed. The excitation light EL is output from the prism 5 into a direction different from the direction of output of the fluorescence light FL. Since the photodetecting element 10 is not disposed so as to be opposed to the side face 5b from which the excitation light EL is output, but disposed so as to be opposed to the side face 5d from which the fluorescence light FL is output, it is hard for the excitation light to enter the photodetecting element 10. Therefore, the photodetecting element 10 can be prevented from detecting the excitation light EL. Since the side face 5d of the prism 5 is coated with the excitation light cut coating, the photodetecting element 10 can be further prevented from detecting the excitation light EL.

The embodiment of the present invention was described above, but it should be noted that the present invention is by no means intended to be limited only to the above embodiment.

Figure 6:
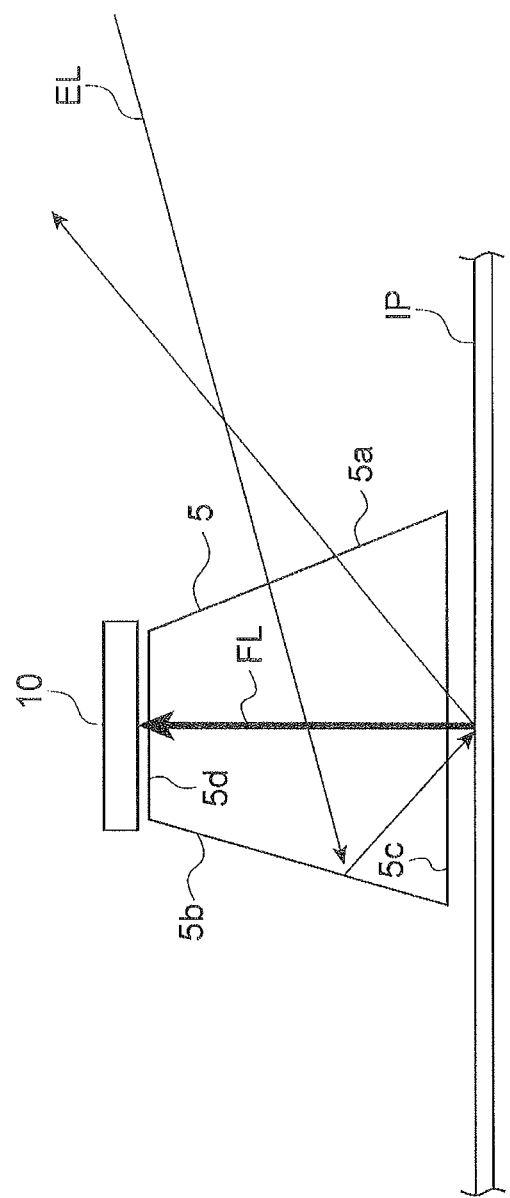
FIG. 6 is a cross-sectional view showing a modification example of the prism.

For example, as shown in FIG. 6, the side face 5b may be a face that reflects the excitation light EL. The side face 5b is coated with a coating (reflective coating) for reflecting the excitation light EL, whereby the side face 5b serves as a face to reflect the excitation light EL. In this case as well, when the excitation light EL is incident through the side face 5a into the prism 5, the excitation light EL propagates inside the prism 5 and is reflected by the side face 5b. The excitation light EL reflected by the side face 5b is output from the side face 5c. Namely, the prism 5 is configured so as to reflect the excitation light EL incident through the side face 5a, by the side face 5b and output the excitation light EL from the side face 5c. The imaging plate IP is irradiated with the excitation light EL output from the side face 5c (prism 5). When the imaging plate IP is irradiated with the excitation light EL, the imaging plate IP emits the fluorescence light FL. The fluorescence light FL incident into the prism 5 propagates inside the prism 5 and is output from the side face 5d. The fluorescence light FL output from the side face 5d (prism 5) is incident to the photodetecting element 10 to be detected by the photodetecting element 10. The excitation light EL as reflection from the imaging plate IP is incident through the side face 5c into the prism 5. The reflection (excitation light EL) incident into the prism 5 propagates inside the prism 5 and is output from the side face 5a. Namely, the prism 5 is also configured so as to output the reflection (excitation light EL) incident through the side face 5c, from the side face 5a. The prism 5 is disposed so that the excitation light EL incident through the side face 5a into the prism 5 is output from the side face 5c and so that the reflection incident through the side face 5c is output from the side face 5a. The prism 5 outputs the excitation light EL and the fluorescence light FL from the different side faces 5a, 5c, 5d. The prism 5 makes the excitation light EL travel not toward the side face 5d to which the photodetecting element 10 is opposed, but toward the side face 5a to which the photodetecting element 10 is not opposed. The excitation light EL is output from the prism 5 into a direction different from the direction of output of the fluorescence light FL. Since the photodetecting element 10 is not disposed so as to be opposed to the side face 5a from which the excitation light EL is output, but disposed so as to be opposed to the side face 5d from which the fluorescence light FL is output, it is hard for the excitation light to enter the photodetecting element 10. Therefore, the photodetecting element 10 can be prevented from detecting the excitation light EL.

Figure 7:
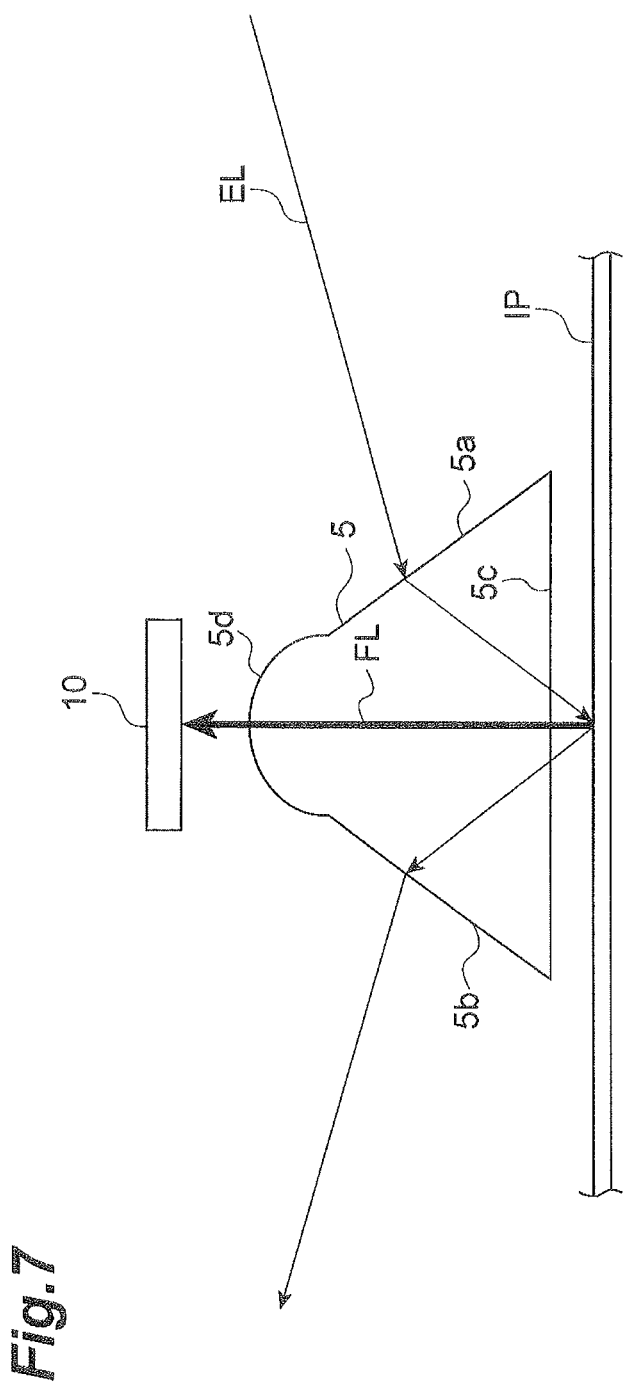
FIG. 7 is a cross-sectional view showing a modification example of the prism.

For example, as shown in FIG. 7, the side face 5d may be of a lens shape. In this case as well, the prism 5 makes the excitation light EL travel not toward the side face 5d to which the photodetecting element 10 is opposed, but toward the side face 5b to which the photodetecting element 10 is not opposed. The excitation light EL is output from the prism 5 into a direction different from the direction of output of the fluorescence light FL. Since the photodetecting element 10 is not disposed so as to be opposed to the side face 5b from which the excitation light EL is output, but disposed so as to be opposed to the side face 5d from which the fluorescence light FL is output, it is hard for the excitation light to enter the photodetecting element 10. Since the side face 5d is of the lens shape, it can improve light condensing efficiency of the fluorescence light FL.

Figure 8:
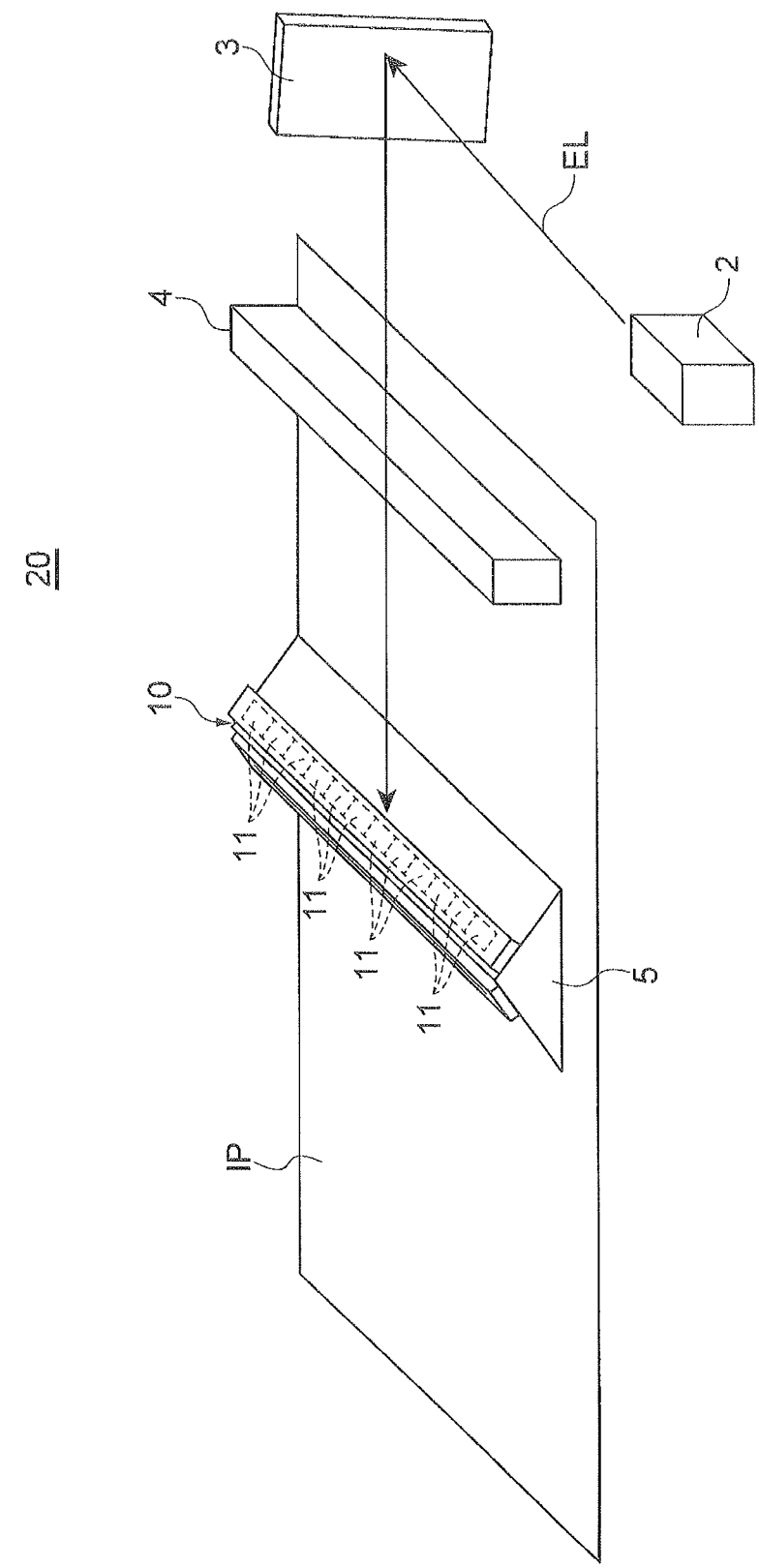
FIG. 8 is a schematic configuration diagram showing a radiation image detecting device according to a modification example of the embodiment.

In the above embodiment, the prism 5 has the cross section of the trapezoid shape, but the cross-sectional shape of the prism 5 does not have to be limited only to the trapezoid. For example, as shown in FIG. 8, the cross section of the prism 5 may be a triangular shape. In this case, the prism 5 is of a triangular prism shape. The radiation image detecting device 20 shown in FIG. 8 has the excitation light source 2, the MEMS mirror 3, the scan lens 4, the prism 5, and a plurality of photodetecting elements 10. In the present modification example, the radiation image detecting device 20 has a pair of photodetecting elements 10.

FIG. 9 shows a cross-sectional view of the prism 5. The prism 5 has three side faces 5a, 5b, and 5c. Each of the side faces 5a, 5b, and 5c constitutes a corresponding side of a triangle being the cross-sectional shape of the prism 5. The side face 5c constitutes the side with the longest length in the foregoing triangle. The side face 5c is opposed to the imaging plate IP. The excitation light EL is incident through the side face 5a into the prism 5. Namely, the side face 5a is an entrance surface for the excitation light EL. The pair of photodetecting elements 10 are disposed near a connection region between the side face 5a and the side face 5b (at respective positions opposite to the imaging plate IP). One photodetecting element 10 is disposed in the vicinity of a corner made by the side face 5a and the side face 5b, on the side face 5a. The photodetecting element 10 is disposed so as to be opposed to a region different from a region where the excitation light is incident, in the side face 5a. The other photodetecting element 10 is disposed so as to be opposed to a region different from a region where the excitation light is output, in the side face Sb.

When the excitation light EL is incident through the side face 5a into the prism 5, the excitation light EL propagates inside the prism 5 and is output from the side face 5c. Namely, the prism 5 is configured so as to output the excitation light EL incident through the side face 5a, from the side face 5c. The imaging plate IP is irradiated with the excitation light EL output from the side face 5c (prism 5). When imaging plate IP is irradiated with the excitation light EL, the imaging plate IP emits the fluorescence light FL. The fluorescence light FL is incident through the side face 5c into the prism 5. The fluorescence light FL incident into the prism 5 propagates inside the prism 5 and is output from the side face 5a and from the side face 5b. Namely, the prism 5 is also configured so as to output the fluorescence light FL incident through the side face 5c, from the side face 5a and from the side face 5b. The fluorescence light FL output from the side face 5a and from the side face 5b (prism 5) is incident to the corresponding photodetecting elements 10 to be detected by the respective photodetecting elements 10. The excitation light EL as reflection from the imaging plate IP is incident through the side face 5c into the prism 5. The reflection (excitation light EL) incident into the prism 5 propagates inside the prism 5 and is output from the side face 5b. Namely, the prism 5 is also configured so as to output the reflection (excitation light EL) incident through the side face 5c, from the side face 5b.

In the present modification example as well, as described above, the prism 5 is disposed so that the excitation light EL incident through the side face 5a into the prism 5 is output from the side face 5c and so that the reflection incident into the prism 5 is output from the side face 5b. The imaging plate IP is irradiated with the excitation light EL output from the side face 5c. The fluorescence light FL emitted from the imaging plate IP is incident through the side face 5c into the prism 5. The prism 5 outputs the fluorescence light FL incident through the side face 5c, from each of the side faces 5a and 5b. The prism 5 outputs the excitation light EL and the fluorescence light FL from the different side faces 5a, 5b, and 5c. The prism 5 makes the excitation light EL travel not toward the region to which the photodetecting element 10 is opposed, but toward the region to which the photodetecting element 10 is not opposed, in the side face 5b. The excitation light EL is output from the prism 5 into a direction different from the direction of output of the fluorescence light FL. Since the photodetecting element 10 is not disposed so as to be opposed to the region from which the excitation light EL is output, but disposed so as to be opposed to the region from which the fluorescence light FL is output, in the side face 5b, it is hard for the excitation light to enter the photodetecting element 10. Since the photodetecting element 10 is not disposed so as to be opposed to the region from which the excitation light EL is output, but disposed so as to be opposed to the region from which the fluorescence light FL is output, in the side face 5a as well, it is hard for the excitation light to enter the photodetecting element 10. Therefore, the photodetecting elements 10 can be prevented from detecting the excitation light EL. The pair of photodetecting elements 10 are disposed in the vicinity of the connection region between the side face 5a and the side face 5b (near the corner made by the side face 5a and the side face 5b), in the prism 5.

In the above embodiment and modification examples, the photodetecting element 10 includes a plurality of channels, each channel including the photodiode array 11 that includes the plurality of avalanche photodiodes to operate in Geiger mode, and the quenching resistors connected in series to the respective avalanche photodiodes. In the radiation image detecting devices 20 of the embodiment and modification examples, the excitation light EL is output from the region off the region to which the photodetecting element 10 is opposed, in the prism 5. For this reason, it is hard for the excitation light EL to enter the plurality of avalanche photodiodes. If the excitation light is incident to the plurality of avalanche photodiodes, not only the fluorescence light but also the excitation light will be subjected to avalanche multiplication. Since it is hard for the excitation light EL to enter the plurality of avalanche photodiodes, it is feasible to minimize influence of the excitation light EL that could increase due to the avalanche multiplication.

INDUSTRIAL APPLICABILITY

The present invention is applicable to the radiation image detecting devices which detect fluorescence light emitted from a recording medium with a radiation image recorded therein.

REFERENCE SIGNS LIST 1 semiconductor substrate; 2 excitation light source; 3 MEMS mirror; 4 scan lens; 5 prism; 10 photodetecting element; 11 photodiode array; 20 radiation image detecting device; EL excitation light; FL fluorescence light; IP imaging plate.

The invention claimed is:

1. A radiation image detecting device configured to detect fluorescence light emitted from a recording medium with a radiation image recorded therein by applying excitation light to the recording medium, comprising:
   a photodetecting element that detects the fluorescence light; and
   a prism that is disposed so as to be located on an optical path of the excitation light traveling toward the recording medium and between the photodetecting element and the recording medium,
   wherein the prism includes, as surface thereof, a first surface that is opposed to the recording medium and a second surface and a third surface that are inclined relative to the first surface, the prism being disposed so that the excitation light incident through the second surface propagates inside and is output from the first surface and so that reflection from the recording medium incident through the first surface propagates inside and is output from the second surface or from the third surface, and
   wherein the photodetecting element is disposed so as to be opposed to a region different from a region where the reflection from the recording medium is output, in the surface of the prism.

2. The radiation image detecting device according to claim 1, wherein the third surface is a surface that transmits the excitation light, and wherein the prism is disposed so as to output the reflection from the recording medium incident through the first surface, from the third surface.

3. The radiation image detecting device according to claim 1, wherein the third surface is a surface that reflects the excitation light, and wherein the prism is disposed so that the excitation light incident through the second surface is reflected by the third surface and output from the first surface and so that the reflection from the recording medium incident through the first surface is output from the second surface.

4. The radiation image detecting device according to claim 1, wherein the photodetecting element is disposed so as to be opposed to a region different from a region where the excitation light is incident, in the second surface.

5. The radiation image detecting device according to claim 1, wherein the photodetecting element is disposed so as to be opposed to a region different from a region where the reflection from the recording medium is output, in the third surface.

6. The radiation image detecting device according to claim 1, wherein the prism includes a fourth surface that is opposed to the first surface as the surface, and wherein the photodetecting element is disposed so as to be opposed to the fourth surface.

7. The radiation image detecting device according to claim 1, wherein the photodetecting element comprises a plurality of channels, each channel comprising a photodiode array that includes a plurality of avalanche photodiodes to operate in Geiger mode, and quenching resistors connected in series to the respective avalanche photodiodes.

* * * * *